US005959940A

United States Patent [19]

Assanuma

[11] Patent Number: 5,959,940

[45] Date of Patent: Sep. 28, 1999

[54] CONTROLLER TIMER

[75] Inventor: Carlos Harada Assanuma, Sao Paulo, Brazil

[73] Assignee: Elsys Equipamentos de Segurancada Amazonia Ltda., Sao Paulo, Brazil

[21] Appl. No.: 08/755,760

[22] Filed: Nov. 21, 1996

[30] Foreign Application Priority Data

Nov. 23, 1995 [BR] Brazil ..................................... 9504997

[51] Int. Cl.[6] ............................ G04F 8/00; G04B 47/00; H01H 3/34; H04Q 3/00

[52] U.S. Cl. ................................ 368/9; 368/10; 368/107; 307/141.4; 340/309.15

[58] Field of Search ............................ 368/9, 10, 72–75, 368/107–113, 250, 252, 272–273; 200/38 R, 37 R, 36 R; 307/140, 141, 141.4; 340/309.11, 309.4

[56] References Cited

U.S. PATENT DOCUMENTS

| | | | |
|---|---|---|---|
| 2,641,897 | 6/1953 | Maas | 368/75 |
| 4,187,499 | 2/1980 | Scheer | 340/309.1 |
| 4,251,877 | 2/1981 | Scheer | 368/251 |
| 4,357,692 | 11/1982 | Broghammer et al. | 368/75 |
| 4,712,926 | 12/1987 | Tanabe | 368/251 |
| 4,743,820 | 5/1988 | Veach | 318/578 |
| 5,239,523 | 8/1993 | Chin-Hsing | 368/63 |
| 5,293,356 | 3/1994 | Chin-Hsing | 368/272 |

*Primary Examiner*—Vit Miska

*Attorney, Agent, or Firm*—Hughes Hubbard & Reed LLP

[57] ABSTRACT

A timer controls equipment with electrical drivers, in which timer is combined an electromechanical device and an electronic circuit. The timer includes an electromechanical device (1) in conjunction with an electronic circuit (2). The electromechanical device (1) includes a surface (9) on which is printed, in encoded form, the states in which the equipment may be and a sensor (8), or a set of sensors (8), which move in relation to the printed surface (9) by means of an electromechanical transducer (3), detecting the printed codes. The electronic circuit (2) receives signals from reading sensors (8) of the state codes, and transducer signals (3), which exist in the equipment, and command the electrical drivers (4), as well as the movement of the reading sensors (8) of the electromechanical device (1).

5 Claims, 3 Drawing Sheets

CONTROLLER TIMER

FIELD OF THE INVENTION

The present invention describes a timer for the control of equipment containing drivers for electrical loads and combines electromechanical and electronic components. The same functions at present are carried out by either electromechanical timers or electronic timers. The present invention combines the advantages of both of these types in one device.

BACKGROUND OF THE INVENTION

Typical electromechanical timers work with a rotating barrel moved by electrical motors and which have indentations whose position constitutes the different states of the equipment. The indentations open and close electrical contacts which directly switch on and off the equipment loads. In the present invention, electrical sensors move themselves in relation to a coded surface. In contrast with the electromechanical timers, these sensors are used merely to read the state of the equipment while the switching of the electrical loads is accomplished through the use of electronic circuitry thus conferring greater reliability, performance and durability.

In particular, the sensors may be electrical contacts which move over a printed circuit board, where the tracks constitute an encoding of the states. In this case, another advantage of the present invention over the electromechanical timers is the fact that the encoding of the states of the printed circuit board can easily be altered in contrast to the indentations of the rotating barrels which are normally injected in plastic.

In general, electronic timers need additional electronic displays to show the state of the operation which increases the price of the product. In the present invention, the display of the operation is simpler, consisting of an indicator disc which rotates together with the cogwheel. Moreover, when the sensors are electrical contacts moving over a printed circuit board, the alteration of the codes is simple compared to the need to change the mask in the manufacture of the micro-controller as is necessary in the case of electronic timers.

OBJECTS AND SUMMARY OF THE INVENTION

The aim of the present invention is to remedy disadvantages of current technology by means of a timer which includes the following components:

An electromechanical device which contains the coding of the equipment states, functions as a visual indicator of the current state and has the additional advantage that it also allows the user to alter its state. Each state of the equipment corresponds to an action or set of actions which the equipment drivers must carry out. This electromechanical device is made up of a surface on which are printed, in encoded form, the various states of the equipment and a sensor or set of sensors which move in relation to this surface thus detecting the printed codes. The surface is divided into sectors, each one containing a specific code. The sensors may be of different types, for example, electrical contacts, photoelectric or magnetic or any other types, depending upon the way the codes are printed on the surface. From here on, these sensors will be denominated as reading sensors. The movement of the reading sensors in relation to the encoded surface is obtained by the action of an electromechanical transducer such as, for example, at least one solenoid or step motor. This movement is made in steps, that is, the reading sensors are positioned over a sector of the encoded surface and remain there for an amount of time that is defined by the code itself, and in specific cases, by a combination of the codes with signals originated from existing transducers in the equipment. When this time has expired, the sensors move one step to the next sector of the encoded surface driven by the electronic circuit. In certain cases, the combination of the actual code with transducer signals may cause the reading sensors to jump to another sector ignoring the intermediate sectors.

An electronic circuit which receives the signals from the reading sensors and from possible equipment transducers, commands the electric loads in the equipment as well as the reading sensors of the electromechanical device.

The rate of angular dislocation can be programmed, through the electronic circuit, to be a function of the present state code being detected by the reading. This rate can be arbitrarily set and is an improvement over the standard electromechanical timer, whose angular rate depends on a synchronous motor, which advances the timer at fixed angular steps.

Any state can be decoded to represent an arbitrary sequence of electrical loads commands (on/off) and corresponding duration time, as opposite to typical electromechanical timers in which each state corresponds to a single set of load commands (on/off). These characteristics makes this novel approach more flexible, allowing complex sequences of loads commands to be easily designed. In this case, the sequences and corresponding timing will reside in the electronic circuit, typically a micro-controller, which will read the printed code through the reading sensors and will execute the proper programmed sequences of load commands.

BRIEF DESCRIPTION OF THE DRAWINGS

The present invention can best be described in conjunction with the following drawings, in which.

DETAILED DESCRIPTION OF THE DRAWINGS

Figure 1:
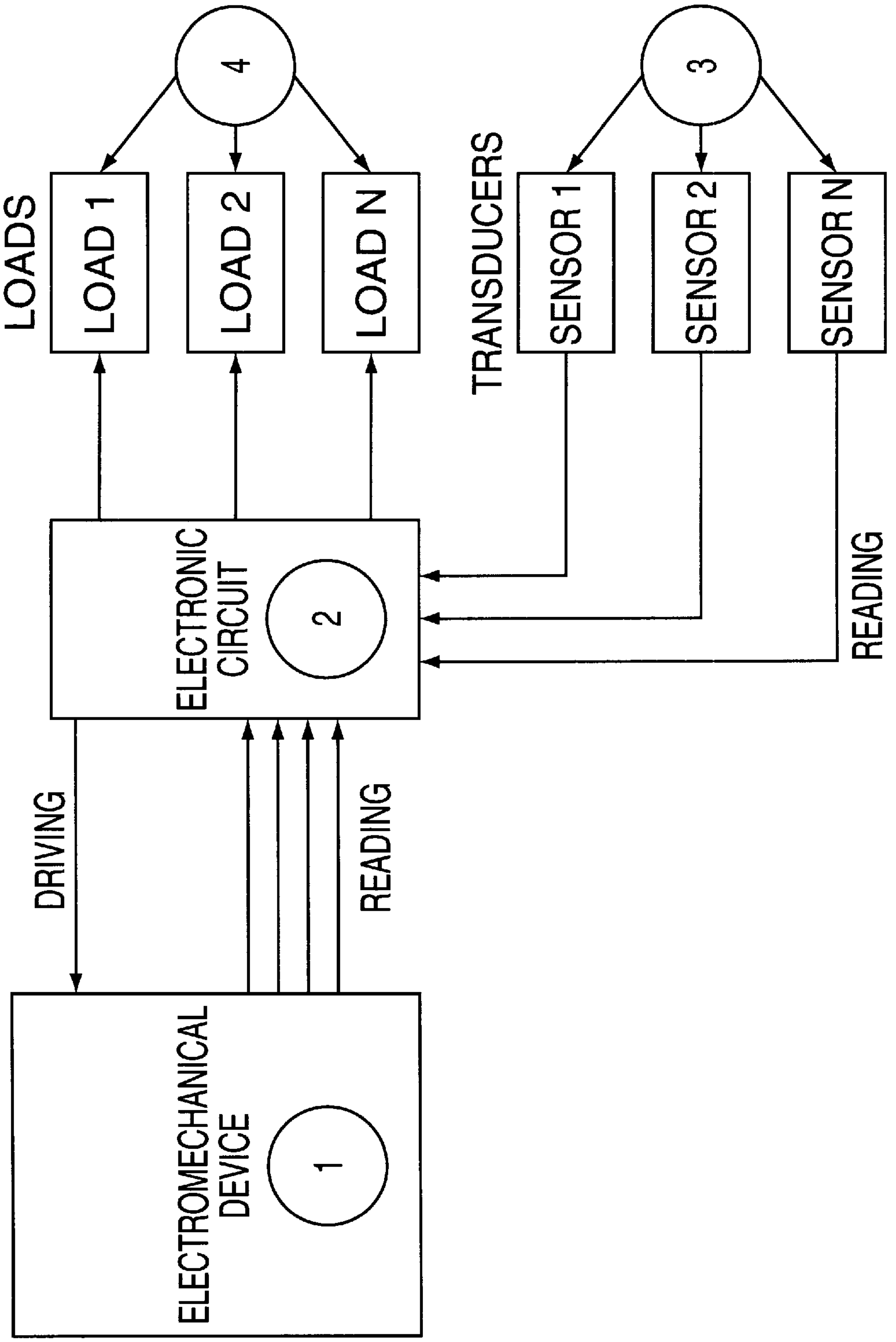
FIG. 1 illustrates the time block diagram of the timer of the present invention.

According to FIG. 1, the electromechanical device (1) containing the encoding of the equipment states, is read by the electronic circuit (2) which also receives signals from transducers (3) contained within the equipment and, in accordance with the current state and the transducer signals (3), drives the electrical loads (4) and the electromechanical device (1).

Figure 2:
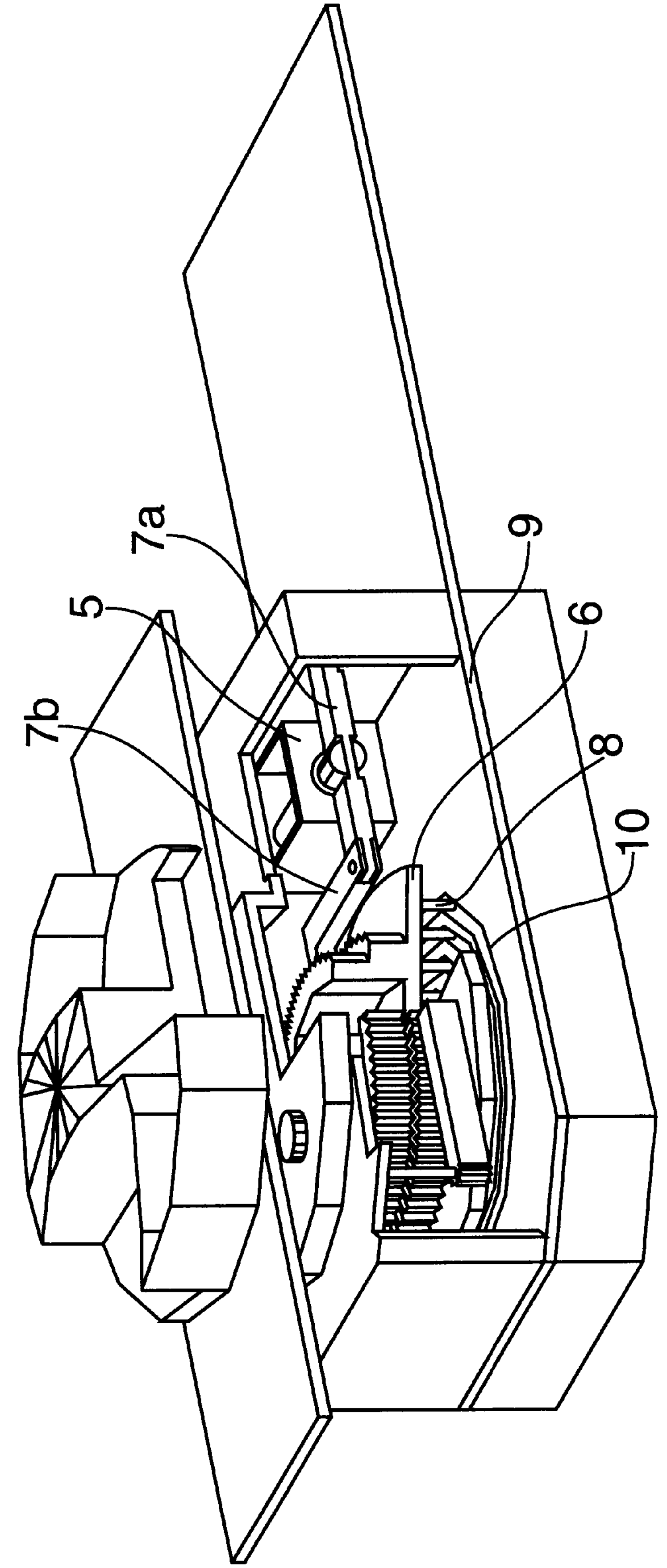
FIG. 2 is an isometric view of the timer of the present invention.

In the diagram in FIG. 2, a solenoid (5), when energized, commands a cogwheel (6) made of insulating material by means of mechanical arms **(7*a*, 7*b*) which rotates in a given angle. An indicator disc (12) rotates together with cogwheel (6). Fixed to the cogwheel (6), are a number of electrical contacts (8) made of conductive material, such as brass, for example. These electrical contacts (8), which may be at least one sensor or a set of a plurality of sensors, move across a printed circuit board (9), where a set of tracks (10), such as, for example, copper tracks, represents the digital codes of the various states of the equipment. This combination makes up the electromechanical device (1). The electronic circuit (2) can be mounted over the printed circuit board (9**) as well as over a separate board.

Figure 3:
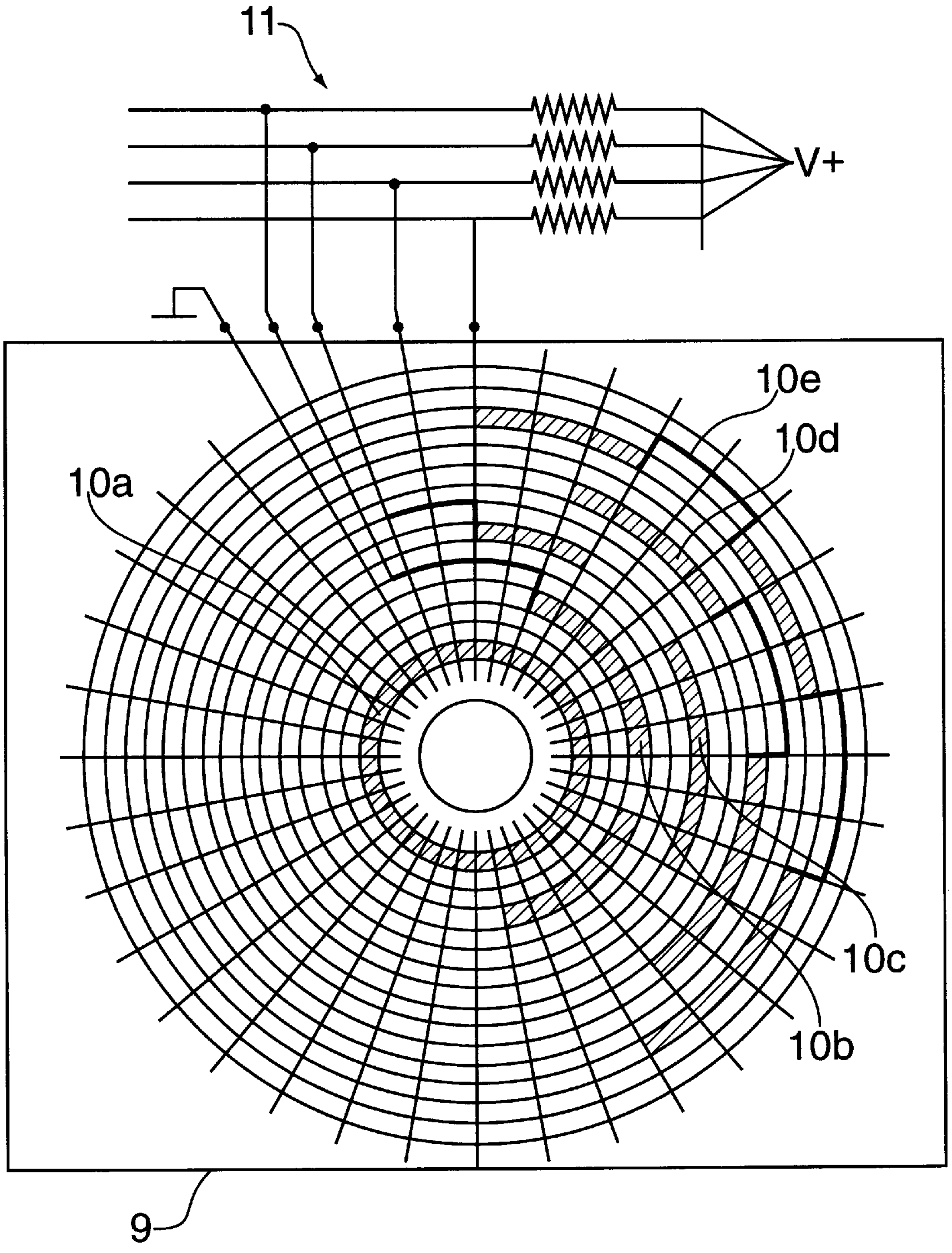
FIG. 3 is a chart showing an example of copper tracks on the printed circuit board of the timer of the present invention.

As shown in FIG. 3, the tracks (10) are arranged in circular form to be able to follow the trajectory of the contacts (8) when these move along with the cogwheel (6). In this example, the contacts (8) are electrically interconnected and the inner track (10*a*) has no gaps and is electrically connected to the ground of the electronic circuit (2). In this way, a contact (8) touching another track (10) is grounded. The tracks which contain the code (10*b*, 10*c*, 10*d*, 10*e*) have a geometric form as shown in FIG. 3. In the angular positions where it is desirable to ground a specific encoded track (10*b,* 10*c*, 10*d*, 10*e*), it is positioned in the trajectory of one of the contacts (8), and in the position in which grounding is undesirable it deviates from the trajectory of the contacts (8). In order to present a well-defined electrical voltage different from zero in the not grounded positions, each encoded track (10)is connected to a resistor lead (11), whose other lead is connected to a voltage which is different from the ground. Thus the codes reading by the electronic circuit (2) is done by the detection of the encoded track's voltage.

Obviously, several modifications can be made in the present invention in the light of the above mentioned. Thus, it must be understood that, within the scope of the following claims, the invention may be used differently from how it is specifically described.

I claim:

1. A controller timer for equipment with electrical states comprising:

at least one equipment transducer generating an input signal corresponding to at least one particular equipment operating state to be controlled;

an electromechanical device operatively connected to said at least one equipment transducer and having a surface upon which is encoded equipment operating states, at least one reading sensor moving in relation to said coded surface, electromechanical means to drive the movement of said at least one reading sensor, and indicating means operatively connected to the electromechanical means and rotatable with said at least one reading sensor for indicating the particular equipment state; and an electronic circuit to receive signals from the least one reading sensor, to send signals to said equipment for operation control, and to send signals to said electromechanical means to control the movement of said at least one reading sensor.

2. The controller timer of claim 1, wherein the movement of said at least one reading sensor is driven by a solenoid.

3. The controller timer of claim 1 wherein said coded surface comprises a print circuit board having a plurality of tracks which encode equipment states.

4. The controller timer of claim 1 wherein said electromechanical means drives the movement of said at least one sensor by dislocating a cogwheel having a plurality of sensors to read said tracks on said print circuit board.

5. The controller timer of claim 2 wherein said solenoid is part of a step motor.

* * * * *